DEMAGNETIZING DEVICE

Filed Oct. 18, 1946

Inventor
HUGH A. HOWELL by The Firm of Charles W. Hills Attys.

Patented Oct. 17, 1950 2,526,358

UNITED STATES PATENT OFFICE 2,526,358

DEMAGNETIZING DEVICE

Hugh A. Howell, Valparaiso, Ind., assignor to The Indiana Steel Products Company, Chicago, Ill., a corporation of Indiana Application October 18, 1946, Serial No. 704,037

5 Claims. (Cl. 179—100.2)

This invention relates to a magnetic recording method and means, and more particularly, to a novel means for conditioning a magnetic record member before subjecting it to the action of an electromagnetic recording head.

One of the principal problems involved in any magnetic recording technique is the conditioning of the magnetic record so as to remove all previous signals and to have it in a suitable condition so that a new magnetic record may be made thereon. It is well recognized that magnetic records which are completely demagnetized have many inherent advantages over those that are saturated in order to remove all prior made magnetic signals thereon.

In order to provide a demagnetized magnetic record member, it has heretofore been considered that the only practical way was to pass the record member through a rapidly fluctuating electromagnetic field, the frequency of fluctuation of which is relatively high. Passing the record through such a high frequency fluctuating magnetic field does not always leave the member perfectly demagnetized, for it will only be perfectly demagnetized if the record member leaves the presence of the magnetic field at a time when the magnetic field is zero.

It is one of the principal features and objects of the present invention to provide novel means for conditioning a magnetic record, and particularly demagnetizing a magnetic record without the necessity of passing the record through a rapidly fluctuating magnetic field.

A further object of the present invention is to demagnetize a traveling record member by first passing the record member through a field preferably sufficiently strong to saturate the record in one direction, and to thereafter pass the record through a field which is 180° out of phase with respect to the saturating field, and which second field is equal to the coercive force of the record member.

Another object of the present invention is to provide a novel magnetic recorder including record erase means which includes disposing a permanent magnet adjacent the path of travel of a record member, so that the record member passes over first one pole and then another of the permanent magnets. The first pole the record member passes over is disposed closely adjacent to or in contact with the record member, while the second pole is spaced a sufficient distance away so that the field of the gap of the second pole is substantially equal to the coercive force of the material forming the record member.

Another and further object of the present invention is to provide a novel magnetic recorder including record erase means which includes disposing an electromagnet adjacent the path of travel of a record member, so that the record member passes over first one pole and then another of the electromagnets. The first pole the record member passes over is disposed closely adjacent to or in contact with the record member, while the second pole is spaced a sufficient distance away so that the field of the gap of the second pole is substantially equal to the coercive force of the material forming the record member.

Another and still further object of the present invention is to provide a novel method and means for magnetic recording in which the record member is first saturated in one direction lying substantially perpendicular to the path of travel of the record member, and then passing the record member through a second field also substantially perpendicular to the path of travel of the record member but in a direction opposite to that of said first field, the second field being substantially equal to the coercive force of the record member, and then longitudinally magnetizing the record member in accordance with and as a function of the signal to be recorded.

The novel features which I believe to be characteristic of my invention are set forth with particularity in the appended claims. My invention itself, however, both as to its organization, manner of construction and method of operation, together with further objects and advantages thereof, may best be understood with reference to the following description taken in connection with the accompanying drawing, in which:

Figures 1, 2, 3:
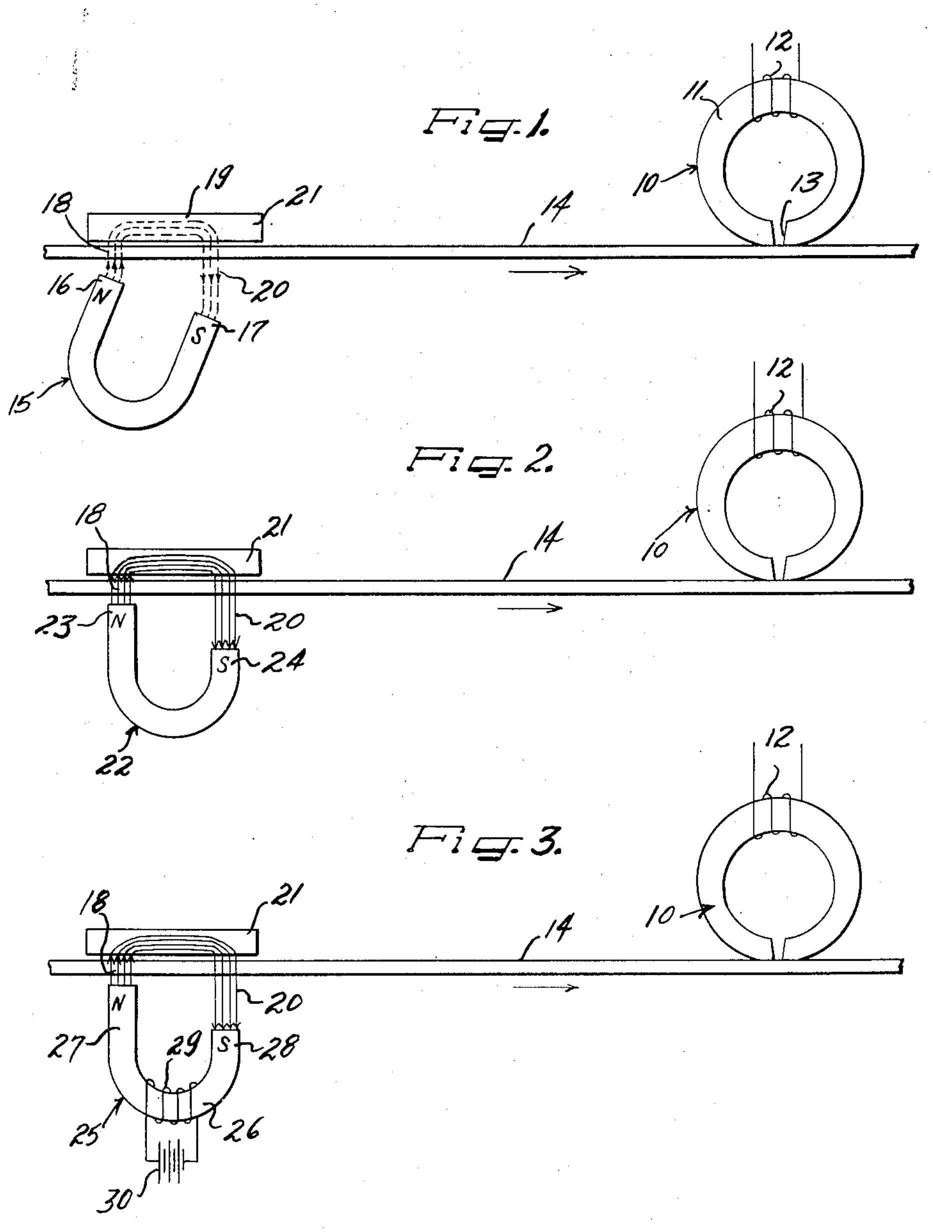
Figure 1 is a diagrammatic sketch of a magnetic recording arrangement including erase means and recording means.
Figure 2 is a view similar to Figure 1, but in which the permanent magnet erase means is in the form of a U-shaped magnet having one leg shorter than the other.
Figure 3 is a view similar to Figures 1 and 2, but in which an electromagnet is employed in the place of the permanent magnet for erasing.

In Figure 1 of the drawing, there is a diagrammatic illustration of one embodiment of my novel recording method and means which includes a recording head 10 having a C-shaped core 11 and a signal coil 12. The core 11 has a non-magnetic gap 13 therein across which a traveling record member 14 passes. The record member 14 may be of any suitable material at least a portion of which is capable of being magnetized and has relatively high magnetic retentivity.

By way of example, and not by way of limitation, the record member 14 may be a tape, and as shown in the drawing is arranged to travel from left to right.

Before the magnetic record member 14 reaches the recording head 10, it is necessary to remove any previous magnetic record which may be on the record member 14, or which may be present due to the fact that the record has at some prior time been subjected to the influence of a magnetic field.

In accordance with the teachings of the present invention, the magnetic record member 14 is conditioned by first passing it through a saturating magnetic field oriented in one direction, and then passing it through a second magnetic field oriented in the opposite direction and of a strength substantially equal to the coercive force of the magnetic material forming the record member 14.

As diagrammatically illustrated in Figure 1, this is done by means of a permanent magnet 15 having two pole portions 16 and 17 of opposite magnetic polarity. Thus, the pole 16 may be a north pole, while the pole 17 may be a south pole. The pole 16 over which the magnetic record member 14 passes first is placed relatively close to the record member 14, and indeed, may be in contact therewith. The magnet should be preferably sufficiently strong so that this north pole 16 will establish a field of sufficient strength so as to magnetically saturate or substantially saturate the record member 14.

The field set up at the north pole 16 is indicated by the flux lines 18. These flux lines, due to the disposition of the north pole 16 with respect to the south pole 17 intersect the record member 14, and then pass across above the record member as at 19 and then back down as at 20. In order to compensate the flux region at 18 and 19 so that the majority of the flux lines pass directly through the record member 14, it is preferable that a soft iron armature or keeper 21 be disposed immediately above the magnetizable record member 14. This will tend to cause the flux lines to be bunched above the record in the region 19 so that the majority of the flux lines intersect the record member 14 at a sharp angle.

By virtue of the fact that the south pole 17 is considerably further away from the record member 14 than the north pole 16, it will, of course, be appreciated that the field represented by the flux lines 20 is substantially weaker than that represented by the flux lines 18.

It is one of the principal features of the present invention to so adjust the spacing of the pole 17 with respect to the normal path of travel of the record member 14 that the field 20 will be substantially equal to the coercive force of the record member 14. It will thus be understood that when the record member 14 first passes the pole 16, the record member 14 is saturated in a generally upward direction by the field 18, and when it thereafter passes the second field represented by the flux lines 20, the field is in the opposite direction to that represented by the flux lines 18. The record is therefore demagnetized.

If this field be so adjusted by suitable adjustment of the spacing of the pole 17 so that the field is equal to the coercive force of the magnetizable material forming the record member 14, the record member 14 will leave the erasing head in a completely demagnetized condition. It thereafter passes the gap 13 of the recorder head 10 at which time it receives a magnetic record representing any fluctuating electric energy supplied to the coil 12.

In this magnetic recording arrangement, it is preferable to longitudinally magnetize the record in the recording head 10 and transversely saturate and then demagnetize the record member in the erase head. The reason for this lies in the fact that if there is any slight misadjustment of the pole 17 so that the field 20 is not exactly equal to the coercive force of the magnetic material forming the record member 14, the slight discrepancy will not materially affect the recording in the recording head 10, since the recording is at right angles to the saturating and demagnetizing field.

In Figure 2 of the drawing, I have illustrated a modified form of the present invention wherein a permanent magnet 22 is employed having a relatively long leg 23 and a relatively short leg 24. The legs 23 and 24 are, of course, of opposite polarity, and by way of example, the leg 23 may be a north pole and the leg 24 may be a south pole.

An armature or keeper 21 is positioned above the record member 14. The leg 23 is placed closely adjacent or in contact with the record member 14, while the leg 24, being shorter than the leg 23, is, of course, spaced a substantial distance away therefrom. The length of the leg 24 is predetermined so that the field 20 is substantially equal to the coercive force of the material forming the record member 14.

A third embodiment of the present invention is illustrated in Figure 3 of the drawing, wherein an electromagnet 25 is employed rather than a permanent magnet. The electromagnet 25 includes a U-shaped core 26 having a relatively long leg 27 and a relatively short leg 28. The core 26 is provided with a coil 29 which is energized from a suitable source of direct current as indicated by the battery 30. The ampere-turns of the electromagnet 25 are sufficient so as to produce a saturating field 18 opposite the end of the leg 27. The height of the pole 28 is so adjusted that the field 20 represented by the returning flux line is substantially equal to the coercive force of the record member 14. The remaining portions of the recording arrangement are similar to those described in connection with Figure 1.

While I have shown certain particular embodiments of my invention, it will, of course, be understood that I do not wish to be limited thereto, and I, therefore, contemplate by the appended claims to cover all such modifications as fall within the true spirit and scope of my invention.

I claim as my invention:

1. Magnetic recording apparatus comprising an elongated magnetic record member, and means for conditioning said magnetic record member for recording, said conditioning means including a U-shaped permanent magnet disposed on one side of the path of travel of said record member, and an armature member disposed on the opposite side of path of travel, said permanent magnet being arranged so that the record member first passes one pole thereof and then the second pole thereof in succession, said first pole being positioned sufficiently close to the path of travel of said record member and being of sufficient strength to substantially saturate said record member and said other pole of said permanent magnet being positioned a substantial distance further away from the path of travel of said record member so that the field associated therewith has an effective strength at said record member substantially equal to the coercive force of the record member.

2. Magnetic recording apparatus including an elongated magnetic record member and conditioning means for preparing said record member for recording, said conditioning means including a J-shaped permanent magnet having a long leg and a short leg, an armature for the magnet positioned contiguous to the tape and the legs of the magnet, said permanent magnet being disposed on one side of the path of travel of said record member with the long leg in close proximity to said record member and the armature disposed opposite the magnet on the other side of the record member, and the short leg on the trailing side so that the record member passes over first the long leg and then the short leg, the short leg being spaced a sufficient distance away from said record member so that the return flux path creates a magnetic field having an effective strength at said record member substantially equal to the coercive force of said record member.

3. Magnetic recording apparatus including an elongated magnetic record member and conditioning means for preparing said record member for recording, said conditioning means including a J-shaped permanent magnet having a long leg and a short leg, said permanent magnet being disposed on one side of the path of travel of said record member with the long leg in close proximity to said record member, and the short leg being aligned with the path of said record member so that portions of the record member passing over said magnet first pass over the long leg and then the short leg, and an armature member located on the opposite side of the path of travel of said record member from said permanent magnet and substantially directly opposite thereto, said magnet being proportioned so that said long leg saturates said member and said short leg produces a magnetic field at said member substantially equal to the coercive force thereof.

4. Magnetic recording apparatus including an elongated magnetic record member and conditioning means for preparing said record member for recording, an armature for the magnet positioned contiguous to the tape and the legs of the magnet, said conditioning means including a J-shaped electromagnet having a long leg and a short leg, said electromagnet being disposed on one side of the path of travel of said record member with the long leg in close proximity to said record member and the armature disposed opposite the magnet on the other side of the record member, and the short leg being aligned with the path of said record member so that portions of the record member passing over said electromagnet first passes over the long leg and then the short leg, the short leg being spaced a sufficient distance away from said record member so that the return flux path creates a magnetic field having an effective strength at said record member substantially equal to the coercive force of said record member.

5. Magnetic recording apparatus including an elongated magnetic record member and conditioning means for preparing said record member for recording, said conditioning means including a J-shaped electromagnet having a long leg and a short leg, said electromagnet being disposed on one side of the path of travel of said record member with the long leg in close proximity to said record member, and the short leg being aligned with the path of said record member so that portions of the record member passing over said electromagnet first pass over the long leg and then the short leg, and a magnetic keeper member located on the opposite side of the path of travel of said record member from said electromagnet and substantially directly opposite thereto, said electromagnet being proportioned so that predetermined current flow therein causes said long leg to saturate said member and said short leg to produce a magnetic field at said member substantially equal to the coercive force thereof.

HUGH A. HOWELL.

REFERENCES CITED

The following references are of record in the file of this patent:

UNITED STATES PATENTS

| Number | Name | Date |
|---|---|---|
| 873,083 | Poulsen | Dec. 10, 1907 |
| 1,828,190 | Kiliani | Oct. 20, 1931 |
| 2,105,016 | Smith | Jan. 11, 1938 |
| 2,230,913 | Schuller | Feb. 4, 1941 |
| 2,351,011 | Camras | June 13, 1944 |
| 2,380,392 | Begun | July 31, 1945 |

FOREIGN PATENTS

| Number | Country | Date |
|---|---|---|
| 322,252 | Germany | June 24, 1920 |
| 214,652 | Switzerland | Aug. 1, 1941 |
| 883,022 | France | Jan. 22, 1943 |

OTHER REFERENCES

Standard Handbook for Electrical Engineers, seventh edition, McGraw-Hill, copy in Div. 16.

The Best Method of Demagnetizing Iron in Magnetic Testing, C. W. Burrows, Bureau of Standards, copy in 175/181, Div. 48.

Review of the Present Status of Magnetic Recording Theory, W. W. Wetzel, Audio Engineering, Dec. 1947; copy in Library.